US010303660B2

(12) United States Patent
Edwards et al.

(10) Patent No.: US 10,303,660 B2
(45) Date of Patent: May 28, 2019

(54) FILE SYSTEM WITH DISTRIBUTED ENTITY STATE

(71) Applicant: Microsoft Technology Licensing, LLC, Redmond, WA (US)

(72) Inventors: Andrew James Edwards, Bellevue, WA (US); David Goebel, Vashon, WA (US); Ishai Ben Aroya, Redmond, WA (US); Ozan Demir, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 722 days.

(21) Appl. No.: 14/939,942

(22) Filed: Nov. 12, 2015

(65) Prior Publication Data
US 2017/0139951 A1 May 18, 2017

(51) Int. Cl.
*G06F 16/18* (2019.01)
*G06F 16/182* (2019.01)
*G06F 17/30* (2006.01)
*H04L 12/911* (2013.01)
*H04L 29/08* (2006.01)

(52) U.S. Cl.
CPC ...... *G06F 16/182* (2019.01); *G06F 17/30194* (2013.01); *H04L 47/726* (2013.01); *H04L 67/1097* (2013.01)

(58) Field of Classification Search
CPC .............. H04L 67/1097; H04L 47/726; G06F 17/30194; G06F 16/182
USPC .......................... 707/827; 709/217, 201, 214
See application file for complete search history.

(56) References Cited

U.S. PATENT DOCUMENTS

| | | | |
|---|---|---|---|
| 7,373,502 B2 | 5/2008 | McGrew | |
| 7,634,583 B2 | 12/2009 | Sagar et al. | |
| 7,716,274 B1 | 5/2010 | Kumar | |
| 7,788,346 B2 | 8/2010 | Kumar et al. | |
| 8,078,737 B2 | 12/2011 | Cosmadopoulos et al. | |
| 8,112,525 B2 | 2/2012 | Langen et al. | |
| 8,631,277 B2 | 1/2014 | Swan et al. | |
| 8,856,582 B2 | 10/2014 | George et al. | |
| 9,619,257 B1 * | 4/2017 | Aron | G06F 9/45533 |
| 9,652,265 B1 * | 5/2017 | Narayanasamy | G06F 13/00 |
| 9,672,122 B1 * | 6/2017 | Gandhi | G06F 11/1425 |
| 2006/0248199 A1 | 11/2006 | Stanev | |

(Continued)

OTHER PUBLICATIONS

"Second Written Opinion issued in PCT Application No. PCT-US2016-060417," dated Oct. 19, 2017.

(Continued)

*Primary Examiner* — Dung K Chau
(74) *Attorney, Agent, or Firm* — Workman Nydegger

(57) ABSTRACT

A distributed file system that includes multiple computing node tiers. Each of at least some of the multiple computing node tiers has multiple computing nodes having like characteristics. The distributed file system also has an executable component in the form of a distribution component that comprises logic that distributes state of file system entities amongst the computing node tiers. The distribution is performed so that latency of file system requests are reduced due to state responsive to many requests being much closer latency wise to the file system requestor(s). Furthermore, the distribution considers durability guarantees of the state, thereby meeting durability guarantees.

20 Claims, 4 Drawing Sheets

Computing System
*100*

(56) References Cited

U.S. PATENT DOCUMENTS

| | | | | |
|---|---|---|---|---|
| 2007/0288587 | A1* | 12/2007 | Aguilera | G06F 9/466 709/214 |
| 2011/0161294 | A1* | 6/2011 | Vengerov | G06F 17/30581 707/637 |
| 2011/0320411 | A1* | 12/2011 | Henderson | G06F 17/30604 707/687 |
| 2013/0054822 | A1 | 2/2013 | Mordani et al. | |
| 2013/0067095 | A1 | 3/2013 | Kruse et al. | |
| 2014/0019413 | A1 | 1/2014 | Braam et al. | |
| 2014/0215007 | A1* | 7/2014 | Rash | H04L 67/1002 709/217 |
| 2015/0019624 | A1 | 1/2015 | Jayakeerthy et al. | |
| 2015/0106420 | A1* | 4/2015 | Warfield | H04L 41/5041 709/201 |
| 2016/0124978 | A1* | 5/2016 | Nithrakashyap | G06F 3/0619 707/639 |

OTHER PUBLICATIONS

International Search Report and the Written Opinion issued in PCT application No. PCT/US2016/060417 dated Mar. 9, 2017.
Cidon, "Data Durability in Cloud Storage Systems", Published Dec. 1, 2014. Retrieved from <<https://web/stanford/edu/cidon/materials/Thesis.pdf>>.
"Fault tolerance in Manta Dave Pacheco's Blog", Published Apr. 24, 2015. Retrieved from <<http://web/archive/org/web/20150424110949/http://dtrace.org/blogs/dap/2013/07/03/fault-tolerance-in-manta/>>.
Subramanyam Rohith, "HDFS Heterogeneous Storage Resource Management Based on Data Temperature", 2015 International Conference on Cloud and Autonomic Computing, IEEE, Sep. 21, 2015. DOI: 10.1109/ICCAC.2015.33.
Hung-Chang Hsiao et al., "Load Rebalancing for Distributed File Systems in Clouds", IEEE Transactiosn on Parallel and Distributed Systems, IEEE Service Center, Los Alamitos, CA, US, vol. 24, No. 5, May 1, 2013. DOI: 10.1109/TPDS/2012.196.
"Session Storage—Apache Tapestry", Published on: Feb. 24, 2013 Available at: http://tapestry.apache.org/session-storage.html.
Cheng, et al., "Abstractions for Usable Information Flow Control in Aeolus", In Proceedings of USENIX Conference on Annual Technical Conference, Jun. 13, 2012, 13 pages.
"Azure File Service: "Net Use the Cloud"", Retrieved on: Aug. 25, 2015 Available at: https://channel9.msdn.com/events/Open-Specifications-Plugfests/Redmond-Interoperability-Protocols-Plugfest-2015/Azure-File-Service-Net-Use-the-Cloud.
"International Preliminary Report on Patentability Issued in PCT Application No. PCT/US2016/060417", dated Jan. 29, 2018, 8 Pages.
Lim, et al., "Active Disk File System: A Distributed, Scalable File System", In Proceedings of the First Eighteenth IEEE Symposium on Mass Storage Systems and Technologies, Apr. 2001, pp. 101-116.

* cited by examiner

FILE SYSTEM WITH DISTRIBUTED ENTITY STATE

BACKGROUND

Computing systems and associated networks have revolutionized the way human beings work, play, and communicate. Nearly every aspect of our lives is affected in some way by computing systems. Computing systems rely on having ready access to data. To promote ready access, file systems typically organize data within files, and allow those files to be placed within a directory structure. The file system also allows for creation, modification and deletion of files or directories. Accordingly, data may be organized in a fashion that is convenient, intuitive, and deterministic way for a human user and/or a computer program so that data can be properly retrieved as needed.

A directory structure for a file system may be confined to a particular local hard drive. However, more recently, the directory structure may include directories that include files accessible over a network. Remoting software often allows a local view of a file system in which the entirety of the file system is remotely located. Accordingly, file systems may conventionally be distributed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a distributed file system that includes multiple computing node tiers. Each of at least some of the multiple computing node tiers has multiple computing nodes having like characteristics. For instance, the computing nodes of a front end computing node tier may each be front end computing nodes that have a similar topological proximity to file system requestors. As an example, such front end computing nodes may handle connections from a load balancer that has a common web address or Internet Protocol (IP) address. Also for instance, the computing nodes of a back end computing node tier may each be back end computing nodes that have a similar topological proximity to a durable store. As an example, such back end computing nodes may be able to mount data portions (e.g., shares, partitions, directories) within the durable store.

The distributed file system also has an executable component in the form of a distribution component that comprises logic that distributes state of file system entities amongst the computing node tiers. The distribution is performed so that durability guarantees remain met and/or to reduce latency of file system requests due to state responsive to many requests being much closer latency wise to the file system requestor(s). This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to a distributed file system that includes multiple computing node tiers. Each of at least some of the multiple computing node tiers has multiple computing nodes having like characteristics. For instance, the computing nodes of a front end computing node tier may each be front end computing nodes that have a similar topological proximity to file system requestors. As an example, such front end computing nodes may handle connections from a load balancer that has a common web address or Internet Protocol (IP) address. Also for instance, the computing nodes of a back end computing node tier may each be back end computing nodes that have a similar topological proximity to a durable store. As an example, such back end computing nodes may be able to mount data portions (e.g., shares, partitions, directories) within the durable store.

The distributed file system also has an executable component in the form of a distribution component that comprises logic that distributes state of file system entities amongst the computing node tiers. The distribution is performed so that durability guarantees remain met and/or to reduce latency of file system requests due to state responsive to many requests being much closer latency wise to the file system requestor(s).

Some introductory discussion of a computing system will be described with respect to FIG. 1. Then, the structure and operation of the distributed file system that efficiently distribute file system entity state will be described with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
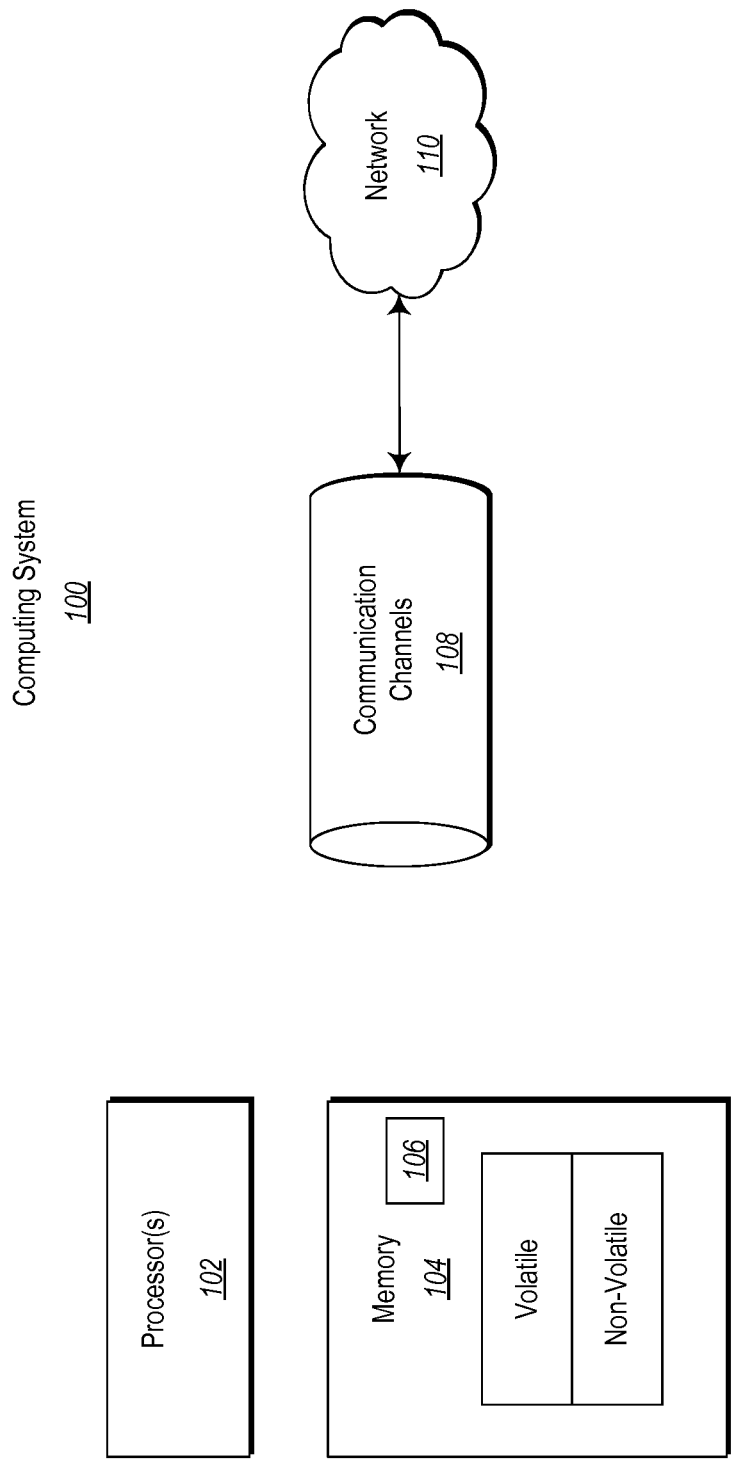
FIG. 1 abstractly illustrates a computing system in which some embodiments described herein may be employed, and which has thereon an executable component.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is reasonably well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable (e.g., as in the case of intermediate language component) or compiled (as in the case of a source code component) so as to generate such binary that is directly interpretable by the processors. Such an understanding of example structures of an executable component is well within the understanding of one of ordinary skill in the art of computing.

The term "executable component" is also reasonably well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is reasonable well understood by those of ordinary skill in the art of computing, whether implemented in software, hardware, or a combination. In this description, the terms "service", "engine", "module" of the like may also be used. As used in this description and in the case, these terms are also intended to be synonymous with the term "executable component", and thus also have a structure that is sufficiently well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network(s) 110. The computing system 100 may also include a display, which may be used to display visual representations to a user.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
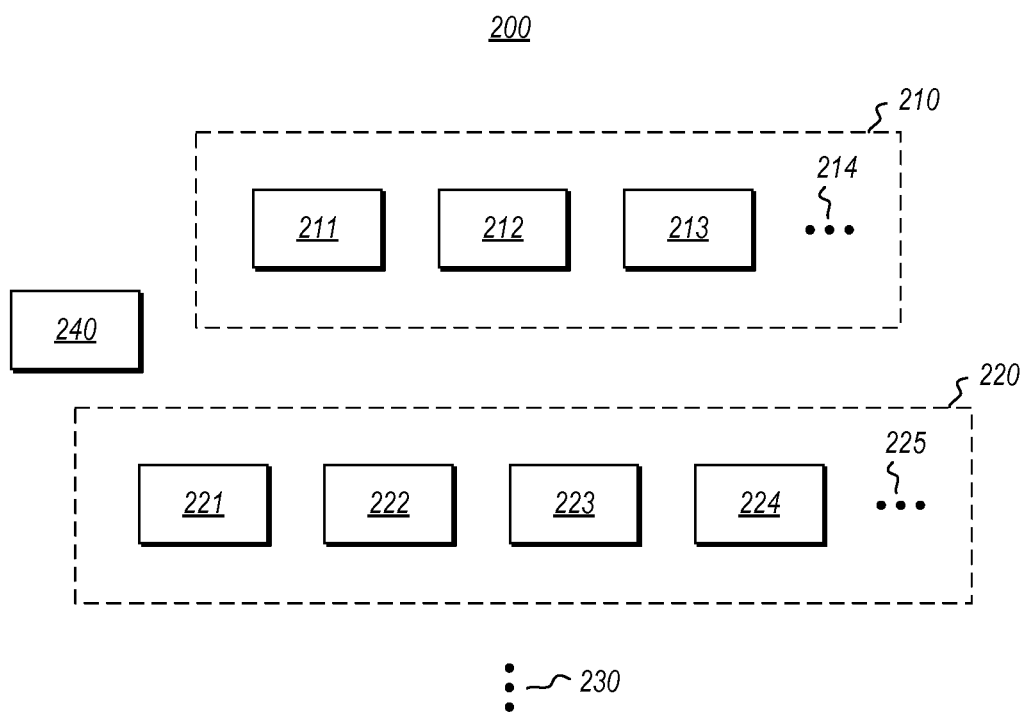
FIG. 2 illustrates a distributed file system in accordance with the principles described herein, and which includes multiple computing node tiers, each of at least some of those tiers having multiple computing nodes that may be physical or virtual processing nodes.

FIG. 2 illustrates a distributed file system in accordance with the principles described herein. The distributed file system 200 includes multiple computing node tiers, including at least a first computing node tier 210 and a second computing node tier 220. However, the principles described herein are not limited to distributed file systems that include just two computing node tiers, as represented by the ellipses 230.

Each of at least some of the computing node tiers includes multiple computing nodes. For instance, first computing node tier 210 is illustrated as including three computing nodes 211, 212 and 213, though the ellipses 214 represents that there may be any number of computing nodes within the computing node tier 210. Furthermore, the second computing node tier 220 is illustrated as including four computing nodes 221, 222, 223 and 224, though the ellipses 215 again represent that there may be any number of computing nodes within the computing node tier 220 as well. Each computing node may be a virtual machine or a physical machine. For instance, each computing node may be structured as described above for the computing system 100.

The tiers are organized according to like characteristics. For instance, the first computing node tier 210 may include computing nodes that have a given like characteristic; and the second computing node tier 220 may include computing nodes that have another given like characteristic. The like characteristic for a given computing node may, for instance, be those computing nodes that are able to perform a particular function. As another example, the like characteristic may include an ability to respond to a file system request within a given latency performance range provided the information required to respond to the request is at the computing node. Furthermore, ready access to a durable store helps to meet durability guarantees.

The distributed file system 200 may also include a distribution component 240 that includes logic 241 that distributes state of a file system entities amongst the computing node tiers so that latency of file system requests are reduced while maintaining expected durability guarantees. For instance, such reduction in latency may be due to state of the file system entities sufficient to respond to some of the file system requests being placed in a computing node tier that is topographically closer to the file system requestor than the state might otherwise be absent such distribution.

Figure 3:
FIG. 3 illustrates an environment that includes a file system entity and associated state.

FIG. 3 illustrates an environment 300 that includes a file system entity 301 and associated state 302. Not all file systems are stateful in the sense that each file system entity has associated state that is maintained regarding the file system entity. However, the principles described herein deal with file systems that are stateful in which there is state 302 associated with at least some, and likely most, and potentially all of the corresponding file system entities 301. The file system entity 301 may be a file, directory, or metadata associated with a file or directory.

Figure 4:
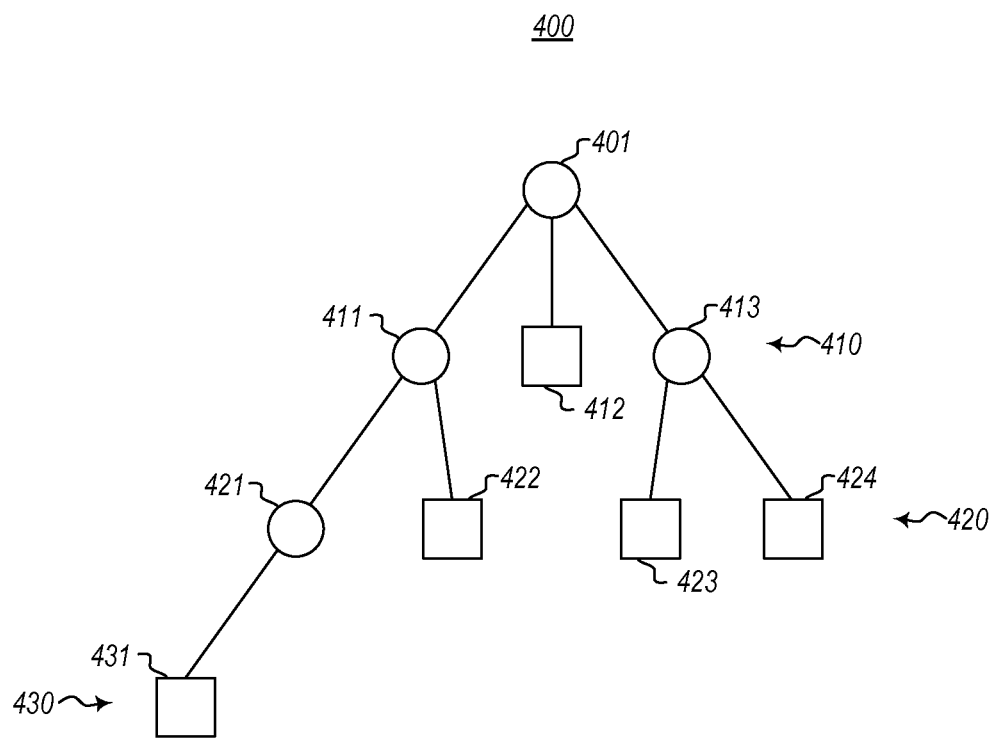
FIG. 4 illustrates an example directory structure having four levels and leaf nodes in the form of files.

As an example, FIG. 4 illustrates an example directory structure 400 having four levels 401, 410, 420 and 430. The directory structure 400 is a simple example, but the principles described herein operate no matter how complex the directory structure of the distributed file system. Furthermore, in the example directory structure 400, there are one-to-one mappings between files and full path names. However, the principles described herein operate even for directory structures in which a single file may have multiple path names. In the example of FIG. 4, directories are represented by circles, and files are represented by squares. In this example, there is a root directory 401 that represents the root level 401 of the directory structure 400. In one example, the root directory 401 may be the parent directory of a data share. The root directory 401 includes two directories 411 and 413 and a file 412, all at the level 410 in the directory structure 400. The directory 411 includes a file 422 and a directory 421, both at the level 420 in the directory structure 400. Directory 421 includes a single file 431 at the level 430 in the directory structure 400. The directory 413 has two files 423 and 424 at the level 420 in the directory structure 400. Each of these files and directories may have associated state, or may have metadata that has associated state. Accordingly, file system entity 301 is shown as having corresponding state 302.

Figure 5:
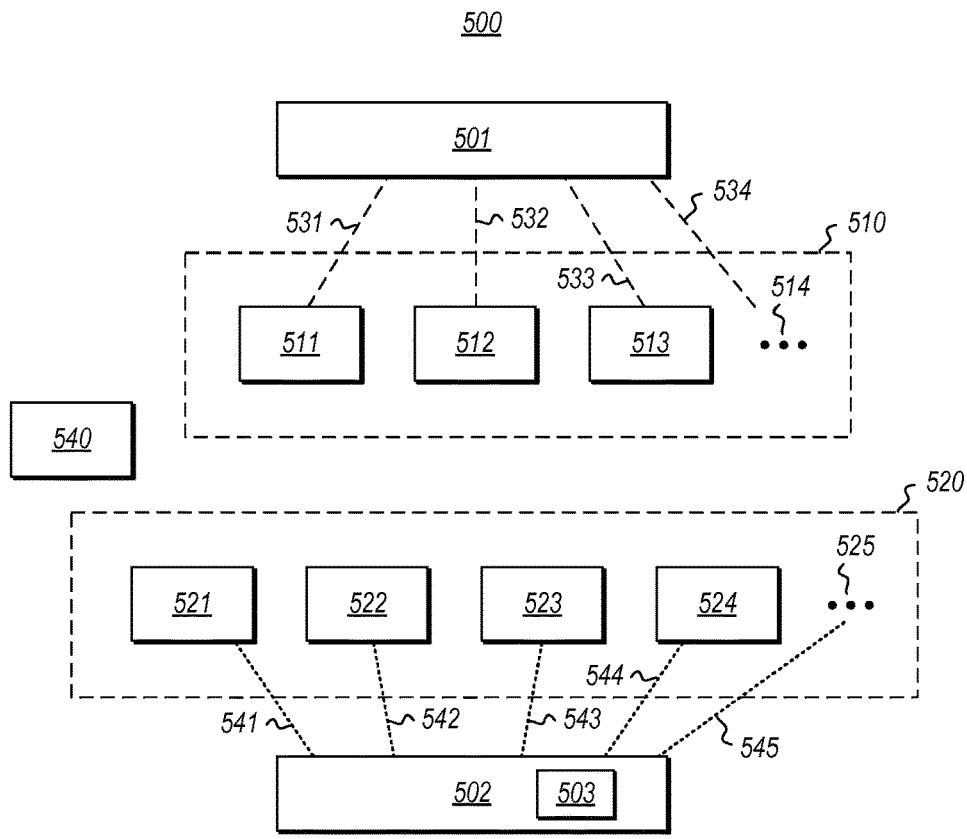
FIG. 5 illustrates a distributed file system entity that is an example of the distributed file system of FIG. 2, and in which there is a load balancer that distributes connection requests to any front end computing node of a front end computing node tier, and in which a data share may be mounted to any back end computing node of a back end computing node tier.

FIG. 5 illustrates a distributed file system entity 500 that is an example of the distributed file system 200 of FIG. 2. In this example, the computing node tier 510 is a front end computing node tier that interfaces with a load balancer 501. The load balancer 501 may be a software load balancer that receives a connection request (such as, but not limited to a various file system request, or a REST request), whereupon the load balancer 501 establishes a connection to a front end computing node 511, 512, 513 or 514 of the front end computing node tier 510. Accordingly, in this example, the like characteristics of the particular computing node tier 210 include a topographical proximity to a file system requestor. For instance, file system requests may be directed towards a web site address or Internet Protocol (IP) protocol address of the load balancer 501, which assigns processing of the file system request to an appropriate front end computing node 511, 512, 513 or 514. In this example, possible connections between the load balancer and respective front end computing nodes 511 through 514 are represented by dashed lines 531 through 534.

Furthermore, in this example, the computing node tier 520 is a back end computing node tier that interfaces with a durable store 502. The durable store 502 may store a mountable data share 503 that has an associated directory structure. For instance, any one or more or all of the back end computing nodes 521, 522, 523, 524 or 525 may mount the data share 503 so as to have claim on the ability to execute file system commands on the data share 503. In this example, possible mountings between the respective back end computing node 521 through 525 and the data share 503 is represented by dotted lines 541 through 545.

The environment 500 also includes an executable component 540 called herein a distribution component 540. The distribution component 540 of FIG. 5 is an example of the distribution component 240 of FIG. 2, and also includes logic that distributes state of the file system entities amongst the tiers 510 and 520. The executable component 540 may be present on a single computing node within the environment 500, or may be distributed across multiple computing nodes. Alternatively or in addition, the executable component 540 may be present within a computing node that is not one of the computing nodes within any of the computing node tiers 510 or 520.

Figure 6:
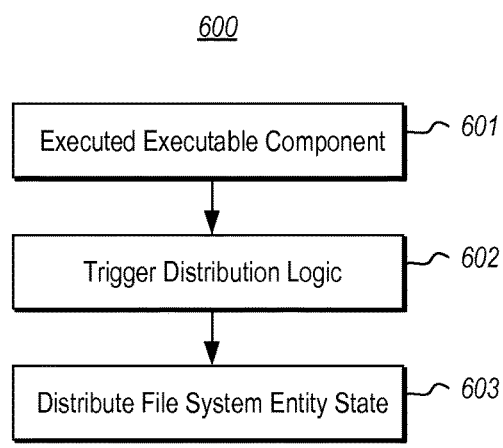
FIG. 6 illustrates an example method that may be performed by an executable distribution component of FIG. 2 and FIG. 5 in order to achieve distribution of file system entity state amongst different computing node tiers in a manner that increases utility of the distributed file system entity.

FIG. 6 illustrates an example method 600 that may be performed by the executable component 540. First, the executable component 540 is executed (act 601). For instance, in the context of FIG. 1, suppose the executable component is the executable component 106 present on the computing system 100. In that case, the executable component 540 may be executed by the one or more processors of the computing system if the executable component 106 has a software structure.

The execution of the executable component thereby triggers logic (act 602) that distributes (act 603) state of multiple of the file system entities amongst at least some of the computing node tiers. Accordingly, in FIG. 5, the executable component 540 distributes file system entity state between the front end computing node tier 510 and the back end computing node tier 520. Similarly, in FIG. 2, the distribution component 240, an example of an executable component, may distribute file system entity state amongst the computing node tiers 210, 220 and 230.

The exact mechanism for distribution is not important. However, the distribution occurs such that durability guarantees are met, and/or such that the latency of file system requests are reduced due to state of the file system entity that is the subject of the corresponding file system request being in a computing node tier that is closer to the corresponding file system request than another computing system node. For instance, in the case of FIG. 5, distribution occurs such that more file system requests can be satisfied wholly by computing nodes at the front end computing node 510 that would occur without distribution.

This reduced latency may be achieved by distributing state such that state that has a state lifetime that tends to be shorter (i.e., transient state) is placed in a front end computing node within the front end computing node tier 510, while state having a state lifetime that tends to be longer (i.e., durable state) and/or that is more critical to maintaining durability guarantees is placed in a back end computing node within the back end computing node tier 520. In other words, the more transient the state and/or the fewer durability guarantees associated with the state, the topologically closer the state might be placed in the computing node tiers.

However, the lifetime of state and the durability guaranty levels of the state might be just be a few of a host of parameters that are considered by the executable components 240 and 540 in determining which computing node tier to place particular file system entity state within. Other factors might include size of the state, reproducibility (e.g., difficulty in reproducing) the state, and so forth. An example algorithm might include, for instance, a simple weighted summation of each of these factors, comparing the summation to a threshold range for each tier, matching the weighted sum to a threshold range of a given tier, and assigning the state to that tier. Another consideration is that back end nodes by their very nature of mounting some or all of a data share are a centralized contended resource. For instance, the back end nodes may be mounted to a partition. Furthermore, the mechanics of data share movement can introduce significant delays.

Accordingly, the principles described herein provide an effective mechanism to distribute file system entity state amongst multiple tiers of a distributed file system entity in a manner that reduces latency of file system requests while maintaining expected durability guarantees. The distribution mechanisms might factor in other goals as well, such as effective use of bandwidth between computing node tiers, effective use of processing capability, and so forth, so as to achieve closer to maximum utilization efficiency of the distributed file system as a whole. Thus, the principles described herein provide a technical improvement in the field of distributed file system that are stateful in that the file system entities have associated state.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A distributed file system comprising:
a first plurality of computing nodes organized into a first computing node tier, each of at least some of the first plurality of computing nodes having a shared characteristic, the shared characteristic comprising being topographically closer, in terms of latency, to a file system requester than at least some of a second plurality of computing nodes;
the second plurality of computing nodes organized into a second computing node tier, each of at least some of the second plurality of computing nodes having a different shared characteristic, the different shared characteristic comprising being topographically closer to a durable store than at least some of the first plurality of computing nodes; and
a distribution component that comprises logic that distributes a state of a plurality of file system entities amongst at least some of the first plurality of computing nodes and the second plurality of computing nodes, the logic considering at least a durability guarantee level of the state when distributing the state such that a first state distributed to the first plurality of computing nodes is a more transient state as compared to a second state distributed to the second plurality of computing nodes.

2. The distributed file system in accordance with claim 1, the like characteristics of a particular one of the plurality of computing node tiers comprising a topological proximity to a file system requestor.

3. The distributed file system in accordance with claim 2, the particular computing node tier being a front end computing node tier.

4. The distributed file system in accordance with claim 1, the like characteristic of a particular one of the plurality of computing node tiers comprising a proximity to a durable store of the distributed file system.

5. The distributed file system in accordance with claim 4, the particular computing node tier being a back end computing node tier.

6. The distributed file system in accordance with claim 1, the like characteristics of a first particular one of the plurality of computing node tiers comprising a topological proximity to a file system requestor, the like characteristics of a second particular one of the plurality of computing node tiers comprising a topological proximity to a durable store of the distributed file system.

7. The distributed file system in accordance with claim 6, the first particular computing node tier being a front end computing node tier comprising a plurality of front end servers, the second particular computing node tier being a back end computing node tier comprising a plurality of back end servers.

8. The distributed file system in accordance with claim 7, further comprising:
a load balancer configured to formulate a connection with any of the plurality of front end servers.

9. The distributed file system in accordance with claim 8, further comprising:
a durable store having a data share that is mountable by any of the plurality of back end servers.

10. The distributed file system in accordance with claim 1, the plurality of file system entities comprising at least one file or directory.

11. The distributed file system in accordance with claim 1, the plurality of file system entities comprising metadata for at least one file or directory.

12. The distributed file system in accordance with claim 1, the distribution entity distributing the state of the plurality of file systems such that a set of one or more durability guarantees is maintained.

13. The distributed file system in accordance with claim 12, the distribution component factoring in size of the state in determining whether the state is to be included the first computing node tier or the second computing node tier.

14. The distributed file system in accordance with claim 12, the distribution component factoring in difficulty in reproducing the state in determining whether the state is to be included in the first computing tier node or the second computing node tier.

15. The distributed file system in accordance with claim 1, the like characteristics of a particular one of the plurality of computing node tiers comprising a latency performance range in responding to a file system requestor.

16. The distributed file system in accordance with claim 1, the like characteristics of a particular one of the plurality of computing node tiers comprising a function of the computing node tier.

17. The distributed file system in accordance with claim 1, at least some of the plurality of computing nodes for least one of the plurality of computing node tiers comprising a physical computing node.

18. The distributed file system in accordance with claim 1, at least some of the plurality of computing nodes for least one of the plurality of computing node tiers comprising a virtual computing node.

19. A method for distributing file system entity state in a distributed computing system, the method comprising:
organizing a first a plurality of computing nodes in a first computing node tier, each of at least some of the first plurality of computing nodes having a shared characteristic comprising being topographically closer, in terms of latency, to a file system requester than at least some of a second plurality of computing nodes;
organizing the second plurality of computing nodes into a second computing node tier, each of at least some of the second plurality of computing nodes having a different shared characteristic comprising being topographically closer to a durable store than at least some of the first plurality of computing nodes; and
distributing a state of a plurality of file system entities amongst at least some of the first plurality of computing nodes and the second plurality of computing nodes, the distribution considering at least a durability guarantee level of the state when distributing the state such that a first state distributed to the first plurality of computing nodes is a more transient state as compared to a second state distributed to the second plurality of computing nodes.

20. A system comprising:
a first plurality of computing nodes organized into a first computing node tier, each of at least some of the first plurality of computing nodes having a shared characteristic, the shared characteristic comprising being topographically closer, in terms of latency, to a file system requester than at least some of a second plurality of computing nodes;
the second plurality of computing nodes organized into a second computing node tier, each of at least some of the second plurality of computing nodes having a different shared characteristic, the different shared characteristic comprising being topographically closer to a durable store than at least some of the first plurality of computing nodes;
one or more processors;
one or more computer readable storage media having thereon computer-executable instructions that are structure such that, when executed by the one or more processors, the system is caused to at least:
distribute a state of a plurality of file system entities amongst at least some of the first plurality of computing nodes and the second plurality of computing nodes, the distribution considering at least a durability guarantee level of the state when distributing the state such that a first state distributed to the first plurality of computing nodes is a more transient state as compared to a second state distributed to the second plurality of computing nodes.

* * * * *